US008836922B1

(12) United States Patent
Pennecot et al.

(10) Patent No.: US 8,836,922 B1
(45) Date of Patent: Sep. 16, 2014

(54) DEVICES AND METHODS FOR A ROTATING LIDAR PLATFORM WITH A SHARED TRANSMIT/RECEIVE PATH

(71) Applicant: Google Inc., Mountain View, CA (US)

(72) Inventors: Gaetan Pennecot, San Francisco, CA (US); Pierre-Yves Droz, Los Altos, CA (US); Drew Eugene Ulrich, San Francisco, CA (US); Daniel Gruver, San Francisco, CA (US); Zachary Morriss, San Francisco, CA (US); Anthony Levandowski, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/971,606

(22) Filed: Aug. 20, 2013

(51) Int. Cl.
G01C 3/08 (2006.01)
G01S 17/02 (2006.01)

(52) U.S. Cl.
CPC .................................... G01S 17/02 (2013.01)
USPC ....... 356/4.01; 356/3.01; 356/5.01; 356/5.09; 356/4.07; 356/9; 356/625; 356/337; 356/342; 356/28; 356/28.5

(58) Field of Classification Search
CPC ...... G01C 3/08; G01C 15/002; G01C 11/025; G01C 15/02; G01C 21/30; G01S 17/89; G01S 7/4817; G01S 17/42; G01S 17/50; G01S 17/158; G01N 15/0205; G01N 15/1459; G01N 21/29; G01N 2015/1486; G01N 21/53; G01N 21/538; G01N 2021/4709; G01N 21/21; G01P 3/36; G01P 5/26; G01P 3/366

USPC ........ 356/4.01, 3.01, 4.07, 5.01, 5.09, 9, 625, 356/337–342, 28, 28.5
See application file for complete search history.

(56) References Cited

U.S. PATENT DOCUMENTS

| 3,790,277 | A |   | 2/1974  | Hogan                       |
|-----------|---|---|---------|-----------------------------|
| 4,516,158 | A | * | 5/1985  | Grainge et al. ...... 348/145 |
| 4,700,301 | A |   | 10/1987 | Dyke                        |
| 4,709,195 | A |   | 11/1987 | Hellekson et al.            |
| 5,202,742 | A |   | 4/1993  | Frank et al.                |
| 5,703,351 | A |   | 12/1997 | Meyers                      |
| 6,046,800 | A | * | 4/2000  | Ohtomo et al. ...... 356/141.1 |
| 6,778,732 | B1| * | 8/2004  | Fermann ...... 385/31         |

(Continued)

FOREIGN PATENT DOCUMENTS

EP  2410358 A1  1/2012

Primary Examiner — Isam Alsomiri
Assistant Examiner — Samantha K Abraham
(74) Attorney, Agent, or Firm — McDonnell Boehnen Hulbert & Berghoff LLP

(57) ABSTRACT

A LIDAR device may transmit light pulses originating from one or more light sources and may receive reflected light pulses that are then detected by one or more detectors. The LIDAR device may include a lens that both (i) collimates the light from the one or more light sources to provide collimated light for transmission into an environment of the LIDAR device and (ii) focuses the reflected light onto the one or more detectors. The lens may define a curved focal surface in a transmit path of the light from the one or more light sources and a curved focal surface in a receive path of the one or more detectors. The one or more light sources may be arranged along the curved focal surface in the transmit path. The one or more detectors may be arranged along the curved focal surface in the receive path.

18 Claims, 11 Drawing Sheets

(56) References Cited

U.S. PATENT DOCUMENTS

| | | |
|---|---|---|
| 7,089,114 B1 | 8/2006 | Huang |
| 7,248,342 B1 | 7/2007 | Degnan |
| 7,255,275 B2 | 8/2007 | Gurevich et al. |
| 7,259,838 B2 * | 8/2007 | Carlhoff et al. .............. 356/5.04 |
| 7,311,000 B2 * | 12/2007 | Smith et al. ................ 73/170.11 |
| 7,361,948 B2 * | 4/2008 | Hirano et al. ................. 257/294 |
| 7,417,716 B2 | 8/2008 | Nagasaka et al. |
| 7,544,945 B2 | 6/2009 | Tan et al. |
| 7,969,558 B2 | 6/2011 | Hall |
| 2002/0140924 A1 * | 10/2002 | Wangler et al. ................. 356/28 |
| 2010/0220141 A1 * | 9/2010 | Ozawa ........................... 347/18 |
| 2011/0216304 A1 | 9/2011 | Hall |

\* cited by examiner

US 8,836,922 B1

DEVICES AND METHODS FOR A ROTATING LIDAR PLATFORM WITH A SHARED TRANSMIT/RECEIVE PATH

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates.

One such sensor is a light detection and ranging (LIDAR) device. A LIDAR can estimates distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse. A laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

SUMMARY

In one example, a light detection and ranging (LIDAR) device is provided that includes a housing configured to rotate about an axis. The housing has an interior space that includes a transmit block, a receive block, and a shared space. The transmit block has an exit aperture and the receive block has an entrance aperture. The LIDAR device also includes a plurality of light sources in the transmit block. The plurality of light sources is configured to emit a plurality of light beams that enter the shared space through the exit aperture and traverse the shared space via a transmit path. The light beams include light having wavelengths in a wavelength range. The LIDAR device also includes a plurality of detectors in the receive block. The plurality of detectors is configured to detect light having wavelengths in the wavelength range. The LIDAR device also includes a lens mounted to the housing. The lens is configured to (i) receive the light beams via the transmit path, (ii) collimate the light beams for transmission into an environment of the LIDAR device, (iii) collect light that includes light from one or more of the collimated light beams reflected by one or more objects in the environment of the LIDAR device, and (iv) focus the collected light onto the detectors via a receive path that extends through the shared space and the entrance aperture of the receive block.

In another example, a method is provided that involves rotating a housing of a light detection and ranging (LIDAR) device about an axis. The housing has an interior space that includes a transmit block, a receive block, and a shared space. The transmit block has an exit aperture and the receive block has an entrance aperture. The method further involves emitting a plurality of light beams by a plurality of light sources in the transmit block. The plurality of light beams enter the shared space via a transmit path. The light beams include light having wavelengths in a wavelength range. The method further involves receiving the light beams at a lens mounted to the housing along the transmit path. The method further involves collimating, by the lens, the light beams for transmission into an environment of the LIDAR device. The method further involves collecting, by the lens, light from one or more of the collimated light beams reflected by one or more objects in the environment of the LIDAR device. The method further involves focusing, by the lens, the collected light onto a plurality of detectors in the receive block via a receive path that extends through the shared space and the entrance aperture of the receive block. The method further involves detecting, by the plurality of detectors in the receive block, light from the focused light having wavelengths in the wavelength range.

These as well as other aspects, advantages, and alternatives, will become apparent to those of ordinary skill in the art by reading the following detailed description, with reference where appropriate to the accompanying figures.

DETAILED DESCRIPTION

Figure 1:
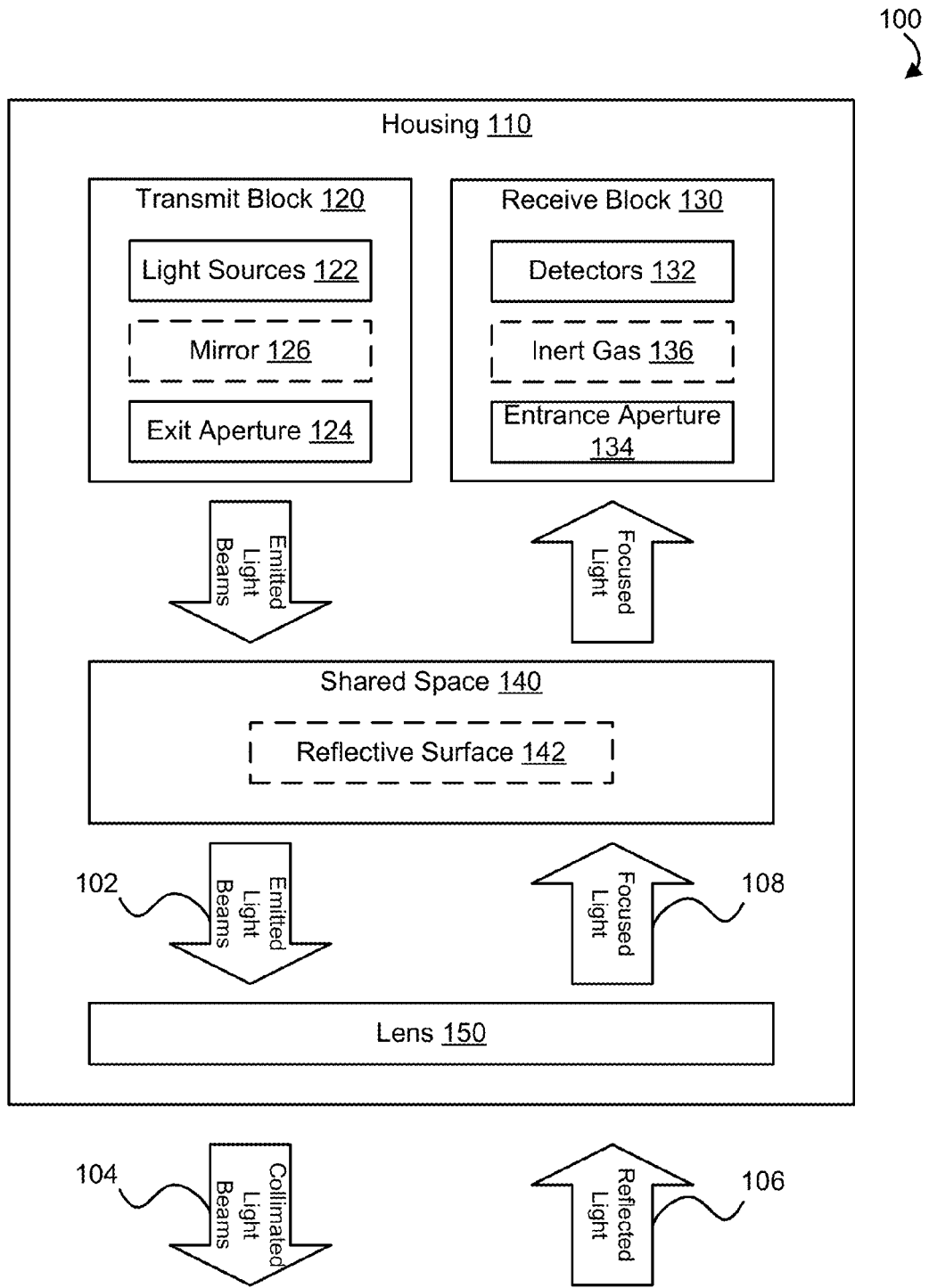
FIG. 1 is a block diagram of an example LIDAR device.

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

A light detection and ranging (LIDAR) device may transmit light pulses originating from a plurality of light sources and may receive reflected light pulses that are then detected by a plurality of detectors. Within examples described herein, a LIDAR device is provided that includes a transmit/receive lens that both collimates the light from the plurality of light sources and focuses the reflected light onto the plurality of detectors. By using a transmit/receive lens that performs both of these functions, instead of a transmit lens for collimating and a receive lens for focusing, advantages with respect to size, cost, and/or complexity can be provided.

The LIDAR device comprises a housing that is configured to rotate about an axis. In some examples, the axis is substantially vertical. The housing may have an interior space that includes various components such as a transmit block that includes the plurality of light sources, a receive block that includes the plurality of detectors, a shared space where emitted light traverses from the transmit block to the transmit/receive lens and reflected light traverses from the transmit/receive lens to the receive block, and the transmit/receive lens that collimates the emitted light and focuses the reflected light. By rotating the housing that includes the various components, in some examples, a three-dimensional map of a 360-degree field of view of an environment of the LIDAR device can be determined without frequent recalibration of the arrangement of the various components.

In some examples, the housing may include radio frequency (RF) and optical shielding between the transmit block and the receive block. For example, the housing can be formed from and/or coated by a metal, metallic ink, or metallic foam to provide the RF shielding. Metals used for shielding can include, for example, copper or nickel.

The plurality of light sources included in the transmit block can include, for example, laser diodes. In one example, the light sources emit light with wavelengths of approximately 905 nm. In some examples, a transmit path through which the transmit/receive lens receives the light emitted by the light sources may include a reflective element, such as a mirror or prism. By including the reflective element, the transmit path can be folded to provide a smaller size of the transmit block and, hence, a smaller housing of the LIDAR device. Additionally, the transmit path includes an exit aperture of the transmit block through which the emitted light enters the shared space and traverses to the transmit/receive lens.

In some examples, each light source of the plurality of light sources includes a respective lens, such as a cylindrical or acylindrical lens. The light source may emit an uncollimated light beam that diverges more in a first direction than in a second direction. In these examples, the light source's respective lens may pre-collimate the uncollimated light beam in the first direction to provide a partially collimated light beam, thereby reducing the divergence in the first direction. In some examples, the partially collimated light beam diverges less in the first direction than in the second direction. The transmit/receive lens receives the partially collimated light beams from the one or more light sources via an exit aperture of the transmit block and the transmit/receive lens collimates the partially collimated light beams to provide collimated light beams that are transmitted into the environment of the LIDAR device. In this example, the light emitted by the light sources may have a greater divergence in the second direction than in the first direction, and the exit aperture can accommodate vertical and horizontal extents of the beams of light from the light sources.

The housing mounts the transmit/receive lens through which light from the plurality of light sources can exit the housing, and reflected light can enter the housing to reach the receive block. The transmit/receive lens can have an optical power that is sufficient to collimate the light emitted by the plurality of light sources and to focus the reflected light onto the plurality of detectors in the receive block. In one example, the transmit/receive lens has a surface with an aspheric shape that is at the outside of the housing, a surface with a toroidal shape that is inside the housing, and a focal length of approximately 120 mm.

The plurality of detectors included in the receive block can include, for example, avalanche photodiodes in a sealed environment that is filled with an inert gas, such as nitrogen. The receive block can include an entrance aperture through which focused light from the transmit/receive lens traverses towards the detectors. In some examples, the entrance aperture can include a filtering window that passes light having wavelengths within the wavelength range emitted by the plurality of light sources and attenuates light having other wavelengths.

The collimated light transmitted from the LIDAR device into the environment may reflect from one or more objects in the environment to provide object-reflected light. The transmit/receive lens may collect the object-reflected light and focus the object-reflected light through a focusing path ("receive path") onto the plurality of detectors. In some examples, the receive path may include a reflective surface that directs the focused light to the plurality of detectors. Additionally or alternatively, the reflective surface can fold the focused light towards the receive block and thus provide space savings for the shared space and the housing of the LIDAR device.

In some examples, the reflective surface may define a wall that includes the exit aperture between the transmit block and the shared space. In this case, the exit aperture of the transmit block corresponds to a transparent and/or non-reflective portion of the reflective surface. The transparent portion can be a hole or cut-away portion of the reflective surface. Alternatively, the reflective surface can be formed by forming a layer of reflective material on a transparent substrate (e.g., glass) and the transparent portion can be a portion of the substrate that is not coated with the reflective material. Thus, the shared space can be used for both the transmit path and the receive path. In some examples, the transmit path at least partially overlaps the receive path in the shared space.

The vertical and horizontal extents of the exit aperture are sufficient to accommodate the beam widths of the emitted light beams from the light sources. However, the non-reflective nature of the exit aperture prevents a portion of the collected and focused light in the receive path from reflecting, at the reflective surface, towards the detectors in the receive block. Thus, reducing the beam widths of the emitted light beams from the transmit blocks is desirable to minimize the size of the exit aperture and reduce the lost portion of the collected light. In some examples noted above, the reduction of the beam widths traversing through the exit aperture can be achieved by partially collimating the emitted light beams by including a respective lens, such as a cylindrical or acylindrical lens, adjacent to each light source.

Additionally or alternatively, to reduce the beam widths of the emitted light beams, in some examples, the transmit/receive lens can be configured to define a focal surface that has a substantial curvature in a vertical plane and/or a horizontal plane. For example, the transmit/receive lens can be configured to have the aspheric surface and the toroidal surface described above that provides the curved focal surface along the vertical plane and/or the horizontal plane. In this configuration, the light sources in the transmit block can be arranged along the transmit/receive lens' curved focal surface in the transmit block, and the detectors in the receive block can be arranged on the transmit/receive lens' curved focal surface in the receive block. Thus, the emitted light beams from the light sources arranged along the curved focal surface can converge into the exit aperture having a smaller size than an aperture for light beams that are substantially parallel and/or diverging.

To facilitate such curved arrangement of the light sources, in some examples, the light sources can be mounted on a curved edge of one or more vertically-oriented printed circuit boards (PCBs), such that the curved edge of the PCB substantially matches the curvature of the focal surface in the vertical plane of the PCB. In this example, the one or more PCBs can be mounted in the transmit block along a horizontal curvature that substantially matches the curvature of the focal surface in the horizontal plane of the one or more PCBs. For example, the transmit block can include four PCBs, with each PCB mounting sixteen light sources, so as to provide 64 light sources along the curved focal plane of the transmit/receive lens in the transmit block. In this example, the 64 light sources are arranged in a pattern substantially corresponding to the curved focal surface defined by the transmit/receive lens such that the emitted light beams converge towards the exit aperture of the transmit block.

For the receive block, in some examples, the plurality of detectors can be disposed on a flexible PCB that is mounted to the receive block to conform with the shape of the transmit/receive lens' focal surface. For example, the flexible PCB may be held between two clamping pieces that have surfaces corresponding to the shape of the focal surface. Additionally, in this example, each of the plurality of detectors can be arranged on the flexible PCB so as to receive focused light from the transmit/receive lens that corresponds to a respective light source of the plurality of light sources. In this example, the detectors can be arranged in a pattern substantially corresponding to the curved focal surface of the transmit/receive lens in the receive block. Thus, in this example, the transmit/receive lens can be configured to focus onto each detector of the plurality of detectors a respective portion of the collected light that comprises light from the detector's corresponding light source.

Some embodiments of the present disclosure therefore provide systems and methods for a LIDAR device that uses a shared transmit/receive lens. In some examples, such LIDAR device can include the shared lens configured to provide a curved focal plane for transmitting light sources and receiving detectors such that light from the light sources passes through a small exit aperture included in a reflective surface that reflects collected light towards the detectors.

FIG. 1 is a block diagram of an example LIDAR device 100. The LIDAR device 100 comprises a housing 110 that houses an arrangement of various components included in the LIDAR device 100 such as a transmit block 120, a receive block 130, a shared space 140, and a lens 150. The LIDAR device 100 includes the arrangement of the various components that provide emitted light beams 102 from the transmit block 120 that are collimated by the lens 150 and transmitted to an environment of the LIDAR device 100 as collimated light beams 104, and collect reflected light 106 from one or more objects in the environment of the LIDAR device 100 by the lens 150 for focusing towards the receive block 130 as focused light 108. The reflected light 106 comprises light from the collimated light beams 104 that was reflected by the one or more objects in the environment of the LIDAR device 100. The emitted light beams 102 and the focused light 108 traverse in the shared space 140 also included in the housing 110. In some examples, the emitted light beams 102 are propagating in a transmit path through the shared space 140 and the focused light 108 are propagating in a receive path through the shared space 140. In some examples, the transmit path at least partially overlaps the receive path in the shared space 140. The LIDAR device 100 can determine an aspect of the one or more objects (e.g., location, shape, etc.) in the environment of the LIDAR device 100 by processing the focused light 108 received by the receive block 130. For example, the LIDAR device 100 can compare a time when pulses included in the emitted light beams 102 were emitted by the transmit block 120 with a time when corresponding pulses included in the focused light 108 were received by the receive block 130 and determine the distance between the one or more objects and the LIDAR device 100 based on the comparison.

The housing 110 included in the LIDAR device 100 can provide a platform for mounting the various components included in the LIDAR device 100. The housing 110 can be formed from any material capable of supporting the various components of the LIDAR device 100 included in an interior space of the housing 110. For example, the housing 110 may be formed from a structural material such as plastic or metal.

In some examples, the housing 110 can be configured for optical shielding to reduce ambient light and/or unintentional transmission of the emitted light beams 102 from the transmit block 120 to the receive block 130. Optical shielding from ambient light of the environment of the LIDAR device 100 can be achieved by forming and/or coating the outer surface of the housing 110 with a material that blocks the ambient light from the environment. Additionally, inner surfaces of the housing 110 can include and/or be coated with the material described above to optically isolate the transmit block 120 from the receive block 130 to prevent the receive block 130 from receiving the emitted light beams 102 before the emitted light beams 102 reach the lens 150.

In some examples, the housing 110 can be configured for electromagnetic shielding to reduce electromagnetic noise (e.g., Radio Frequency (RF) Noise, etc.) from ambient environment of the LIDAR device 110 and/or electromagnetic noise between the transmit block 120 and the receive block 130. Electromagnetic shielding can improve quality of the emitted light beams 102 emitted by the transmit block 120 and reduce noise in signals received and/or provided by the receive block 130. Electromagnetic shielding can be achieved by forming and/or coating the housing 110 with a material that absorbs electromagnetic radiation such as a metal, metallic ink, metallic foam, carbon foam, or any other material configured to absorb electromagnetic radiation. Metals that can be used for the electromagnetic shielding can include for example, copper or nickel.

In some examples, the housing 110 can be configured to have a substantially cylindrical shape and to rotate about an axis of the LIDAR device 100. For example, the housing 110 can have the substantially cylindrical shape with a diameter of approximately 10 centimeters. In some examples, the axis is substantially vertical. By rotating the housing 110 that includes the various components, in some examples, a three-dimensional map of a 360 degree view of the environment of the LIDAR device 100 can be determined without frequent recalibration of the arrangement of the various components of the LIDAR device 100. Additionally or alternatively, the LIDAR device 100 can be configured to tilt the axis of rotation of the housing 110 to control the field of view of the LIDAR device 100.

Although not illustrated in FIG. 1, the LIDAR device 100 can optionally include a mounting structure for the housing 110. The mounting structure can include a motor or other means for rotating the housing 110 about the axis of the LIDAR device 100. Alternatively, the mounting structure can be included in a device and/or system other than the LIDAR device 100.

In some examples, the various components of the LIDAR device 100 such as the transmit block 120, receive block 130, and the lens 150 can be removably mounted to the housing 110 in predetermined positions to reduce burden of calibrating the arrangement of each component and/or subcomponents included in each component. Thus, the housing 110 provides the platform for the various components of the LIDAR device 100 for ease of assembly, maintenance, calibration, and manufacture of the LIDAR device 100.

The transmit block 120 includes a plurality of light sources 122 that can be configured to emit the plurality of emitted light beams 102 via an exit aperture 124. In some examples, each of the plurality of emitted light beams 102 corresponds to one of the plurality of light sources 122. The transmit block 120 can optionally include a mirror 126 along the transmit path of the emitted light beams 102 between the light sources 122 and the exit aperture 124.

The light sources 122 can include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 102. In some examples, the light sources 122 can be configured to emit the emitted light beams 102 in a wavelength range that can be detected by detectors 132 included in the receive block 130. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately 905 nm. Additionally, the light sources 122 can be configured to emit the emitted light beams 102 in the form of pulses. In some examples, the plurality of light sources 122 can be disposed on one or more substrates (e.g., printed circuit boards (PCB), flexible PCBs, etc.) and arranged to emit the plurality of light beams 102 towards the exit aperture 124.

In some examples, the plurality of light sources 122 can be configured to emit uncollimated light beams included in the emitted light beams 102. For example, the emitted light beams 102 can diverge in one or more directions along the transmit path due to the uncollimated light beams emitted by the plurality of light sources 122. In some examples, vertical and horizontal extents of the emitted light beams 102 at any position along the transmit path can be based on an extent of the divergence of the uncollimated light beams emitted by the plurality of light sources 122.

The exit aperture 124 arranged along the transmit path of the emitted light beams 102 can be configured to accommodate the vertical and horizontal extents of the plurality of light beams 102 emitted by the plurality of light sources 122 at the exit aperture 124. It is noted that the block diagram shown in FIG. 1 is described in connection with functional modules for convenience in description. However, the functional modules in the block diagram of FIG. 1 can be physically implemented in other locations. For example, although illustrated that the exit aperture 124 is included in the transmit block 120, the exit aperture 124 can be physically included in both the transmit block 120 and the shared space 140. For example, the transmit block 120 and the shared space 140 can be separated by a wall that includes the exit aperture 124. In this case, the exit aperture 124 can correspond to a transparent portion of the wall. In one example, the transparent portion can be a hole or cut-away portion of the wall. In another example, the wall can be formed from a transparent substrate (e.g., glass) coated with a non-transparent material, and the exit aperture 124 can be a portion of the substrate that is not coated with the non-transparent material.

In some examples of the LIDAR device 100, it may be desirable to minimize size of the exit aperture 124 while accommodating the vertical and horizontal extents of the plurality of light beams 102. For example, minimizing the size of the exit aperture 124 can improve the optical shielding of the light sources 122 described above in the functions of the housing 110. Additionally or alternatively, the wall separating the transmit block 120 and the shared space 140 can be arranged along the receive path of the focused light 108, and thus, the exit aperture 124 can be minimized to allow a larger portion of the focused light 108 to reach the wall. For example, the wall can be coated with a reflective material (e.g., reflective surface 142 in shared space 140) and the receive path can include reflecting the focused light 108 by the reflective material towards the receive block 130. In this case, minimizing the size of the exit aperture 124 can allow a larger portion of the focused light 108 to reflect off the reflective material that the wall is coated with.

To minimize the size of the exit aperture 124, in some examples, the divergence of the emitted light beams 102 can be reduced by partially collimating the uncollimated light beams emitted by the light sources 122 to minimize the vertical and horizontal extents of the emitted light beams 102 and thus minimize the size of the exit aperture 124. For example, each light source of the plurality of light sources 122 can include a cylindrical lens arranged adjacent to the light source. The light source may emit a corresponding uncollimated light beam that diverges more in a first direction than in a second direction. The cylindrical lens may pre-collimate the uncollimated light beam in the first direction to provide a partially collimated light beam, thereby reducing the divergence in the first direction. In some examples, the partially collimated light beam diverges less in the first direction than in the second direction. Similarly, uncollimated light beams from other light sources of the plurality of light sources 122 can have a reduced beam width in the first direction and thus the emitted light beams 102 can have a smaller divergence due to the partially collimated light beams. In this example, at least one of the vertical and horizontal extents of the exit aperture 124 can be reduced due to partially collimating the light beams 102.

Additionally or alternatively, to minimize the size of the exit aperture 124, in some examples, the light sources 122 can be arranged along a substantially curved surface defined by the transmit block 120. The curved surface can be configured such that the emitted light beams 102 converge towards the exit aperture 124, and thus the vertical and horizontal extents of the emitted light beams 102 at the exit aperture 124 can be reduced due to the arrangement of the light sources 122 along the curved surface of the transmit block 120. In some examples, the curved surface of the transmit block 120 can include a curvature along the first direction of divergence of the emitted light beams 102 and a curvature along the second direction of divergence of the emitted light beams 102, such that the plurality of light beams 102 converge towards a central area in front of the plurality of light sources 122 along the transmit path.

To facilitate such curved arrangement of the light sources 122, in some examples, the light sources 122 can be disposed on a flexible substrate (e.g., flexible PCB) having a curvature along one or more directions. For example, the curved flexible substrate can be curved along the first direction of divergence of the emitted light beams 102 and the second direction of divergence of the emitted light beams 102. Additionally or alternatively, to facilitate such curved arrangement of the light sources 122, in some examples, the light sources 122 can be disposed on a curved edge of one or more vertically-oriented printed circuit boards (PCBs), such that the curved edge of the PCB substantially matches the curvature of the first direction (e.g., the vertical plane of the PCB). In this example, the one or more PCBs can be mounted in the transmit block 120 along a horizontal curvature that substantially matches the curvature of the second direction (e.g., the horizontal plane of the one or more PCBs). For example, the transmit block 120 can include four PCBs, with each PCB mounting sixteen light sources, so as to provide 64 light sources along the curved surface of the transmit block 120. In this example, the 64 light sources are arranged in a pattern such that the emitted light beams 102 converge towards the exit aperture 124 of the transmit block 120.

The transmit block 120 can optionally include the mirror 126 along the transmit path of the emitted light beams 102 between the light sources 122 and the exit aperture 124. By including the mirror 126 in the transmit block 120, the transmit path of the emitted light beams 102 can be folded to provide a smaller size of the transmit block 120 and the housing 110 of the LIDAR device 100 than a size of another transmit block where the transmit path that is not folded.

The receive block 130 includes a plurality of detectors 132 that can be configured to receive the focused light 108 via an entrance aperture 134. In some examples, each of the plurality of detectors 132 is configured and arranged to receive a portion of the focused light 108 corresponding to a light beam emitted by a corresponding light source of the plurality of light sources 122 and reflected of the one or more objects in the environment of the LIDAR device 100. The receive block 130 can optionally include the detectors 132 in a sealed environment having an inert gas 136.

The detectors 132 may comprise photodiodes, avalanche photodiodes, phototransistors, cameras, active pixel sensors (APS), charge coupled devices (CCD), cryogenic detectors, or any other sensor of light configured to receive focused light 108 having wavelengths in the wavelength range of the emitted light beams 102.

To facilitate receiving, by each of the detectors 132, the portion of the focused light 108 from the corresponding light source of the plurality of light sources 122, the detectors 132 can be disposed on one or more substrates and arranged accordingly. For example, the light sources 122 can be arranged along a curved surface of the transmit block 120, and the detectors 132 can also be arranged along a curved surface of the receive block 130. The curved surface of the receive block 130 can similarly be curved along one or more axes of the curved surface of the receive block 130. Thus, each of the detectors 132 are configured to receive light that was originally emitted by a corresponding light source of the plurality of light sources 122.

To provide the curved surface of the receive block 130, the detectors 132 can be disposed on the one or more substrates similarly to the light sources 122 disposed in the transmit block 120. For example, the detectors 132 can be disposed on a flexible substrate (e.g., flexible PCB) and arranged along the curved surface of the flexible substrate to each receive focused light originating from a corresponding light source of the light sources 122. In this example, the flexible substrate may be held between two clamping pieces that have surfaces corresponding to the shape of the curved surface of the receive block 130. Thus, in this example, assembly of the receive block 130 can be simplified by sliding the flexible substrate onto the receive block 130 and using the two clamping pieces to hold it at the correct curvature.

The focused light 108 traversing along the receive path can be received by the detectors 132 via the entrance aperture 134. In some examples, the entrance aperture 134 can include a filtering window that passes light having wavelengths within the wavelength range emitted by the plurality of light sources 122 and attenuates light having other wavelengths. In this example, the detectors 132 receive the focused light 108 substantially comprising light having the wavelengths within the wavelength range.

In some examples, the plurality of detectors 132 included in the receive block 130 can include, for example, avalanche photodiodes in a sealed environment that is filled with the inert gas 136. The inert gas 136 may comprise, for example, nitrogen.

The shared space 140 includes the transmit path for the emitted light beams 102 from the transmit block 120 to the lens 150, and includes the receive path for the focused light 108 from the lens 150 to the receive block 130. In some examples, the transmit path at least partially overlaps with the receive path in the shared space 140. By including the transmit path and the receive path in the shared space 140, advantages with respect to size, cost, and/or complexity of assembly, manufacture, and/or maintenance of the LIDAR device 100 can be provided.

In some examples, the shared space 140 can include a reflective surface 142. The reflective surface 142 can be arranged along the receive path and configured to reflect the focused light 108 towards the entrance aperture 134 and onto the detectors 132. The reflective surface 142 may comprise a prism, mirror or any other optical element configured to reflect the focused light 108 towards the entrance aperture 134 in the receive block 130. In some examples where a wall separates the shared space 140 from the transmit block 120. In these examples, the wall may comprise a transparent substrate (e.g., glass) and the reflective surface 142 may comprise a reflective coating on the wall with an uncoated portion for the exit aperture 124.

In embodiments including the reflective surface 142, the reflective surface 142 can reduce size of the shared space 140 by folding the receive path similarly to the mirror 126 in the transmit block 120. Additionally or alternatively, in some examples, the reflective surface 142 can direct the focused light 103 to the receive block 130 further providing flexibility to the placement of the receive block 130 in the housing 110. For example, varying the tilt of the reflective surface 142 can cause the focused light 108 to be reflected to various portions of the interior space of the housing 110, and thus the receive block 130 can be placed in a corresponding position in the housing 110. Additionally or alternatively, in this example, the LIDAR device 100 can be calibrated by varying the tilt of the reflective surface 142.

The lens 150 mounted to the housing 110 can have an optical power to both collimate the emitted light beams 102 from the light sources 122 in the transmit block 120, and focus the reflected light 106 from the one or more objects in the environment of the LIDAR device 100 onto the detectors 132 in the receive block 130. In one example, the lens 150 has a focal length of approximately 120 mm. By using the same lens 150 to perform both of these functions, instead of a transmit lens for collimating and a receive lens for focusing, advantages with respect to size, cost, and/or complexity can be provided. In some examples, collimating the emitted light beams 102 to provide the collimated light beams 104 allows determining the distance travelled by the collimated light beams 104 to the one or more objects in the environment of the LIDAR device 100.

In an example scenario, the emitted light beams 102 from the light sources 122 traversing along the transmit path can be collimated by the lens 150 to provide the collimated light beams 104 to the environment of the LIDAR device 100. The collimated light beams 104 may then reflect off the one or more objects in the environment of the LIDAR device 100 and return to the lens 150 as the reflected light 106. The lens 150 may then collect and focus the reflected light 106 as the focused light 108 onto the detectors 132 included in the receive block 130. In some examples, aspects of the one or more objects in the environment of the LIDAR device 100 can be determined by comparing the emitted light beams 102 with the focused light beams 108. The aspects can include, for example, distance, shape, color, and/or material of the one or more objects. Additionally, in some examples, rotating the housing 110, a three dimensional map of the surroundings of the LIDAR device 100 can be determined.

In some examples where the plurality of light sources 122 are arranged along the curved surface of the transmit block 120, the lens 150 can be configured to have a focal surface corresponding to the curved surface of the transmit block 120. For example, the lens 150 can include an aspheric surface outside the housing 110 and a toroidal surface inside the housing 110 facing the shared space 140. In this example, the shape of the lens 150 allows the lens 150 to both collimate the emitted light beams 102 and focus the reflected light 106. Additionally, in this example, the shape of the lens 150 allows the lens 150 to have the focal surface corresponding to the curved surface of the transmit block 120. In some examples, the focal surface provided by the lens 150 substantially matches the curved shape of the transmit block 120. Additionally, in some examples, the detectors 132 can be arranged similarly in the curved shape of the receive block 130 to receive the focused light 108 along the curved focal surface provided by the lens 150. Thus, in some examples, the curved surface of the receive block 130 may also substantially match the curved focal surface provided by the lens 150.

Figure 2:
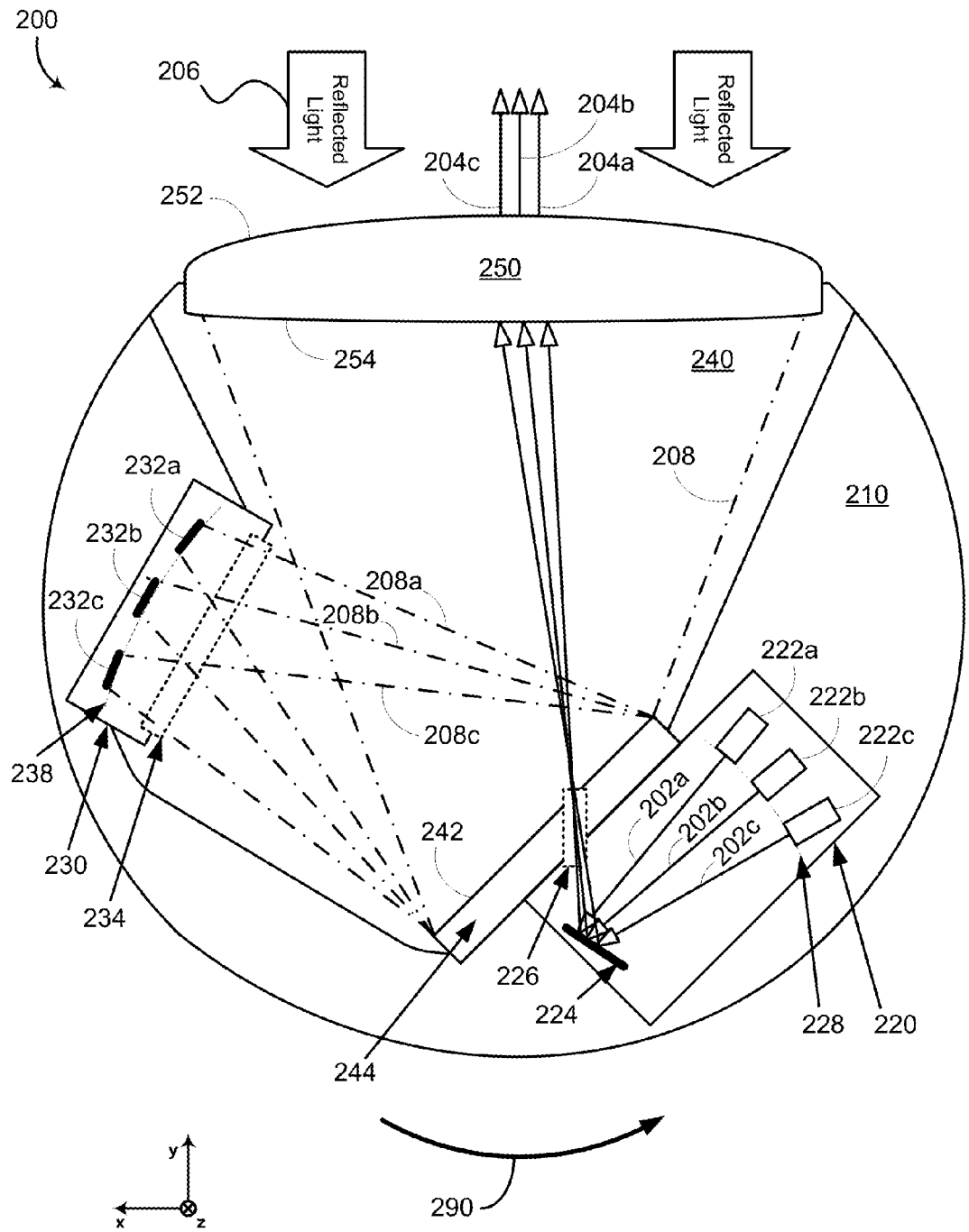
FIG. 2 is a cross-section view of an example LIDAR device.

FIG. 2 is a cross-section view of an example LIDAR device 200. In this example, the LIDAR device 200 includes a housing 210 that houses a transmit block 220, a receive block 230, a shared space 240, and a lens 250. For purposes of illustration, FIG. 2 shows an x-y-z axis, in which the z-axis is in a substantially vertical direction and the x-axis and y-axis define a substantially horizontal plane.

The structure, function, and operation of various components included in the LIDAR device 200 are similar to corresponding components included in the LIDAR device 100 described in FIG. 1. For example, the housing 210, the transmit block 220, the receive block 230, the shared space 240, and the lens 250 are similar, respectively, to the housing 110, the transmit block 120, the receive block 130, and the shared space 140 described in FIG. 1.

The transmit block 220 includes a plurality of light sources 222a-c arranged along a curved focal surface 228 defined by the lens 250. The plurality of light sources 222a-c can be configured to emit, respectively, the plurality of light beams 202a-c having wavelengths within a wavelength range. For example, the plurality of light sources 222a-c may comprise laser diodes that emit the plurality of light beams 202a-c having the wavelengths within the wavelength range. The plurality of light beams 202a-c are reflected by mirror 224 through an exit aperture 226 into the shared space 240 and towards the lens 250. The structure, function, and operation of the plurality of light sources 222a-c, the mirror 224, and the exit aperture 226 can be similar, respectively, to the plurality of light sources 122, the mirror 124, and the exit aperture 226 discussed in the description of the LIDAR device 100 of FIG. 1.

Although FIG. 2 shows that the curved focal surface 228 is curved in the x-y plane (horizontal plane), additionally or alternatively, the plurality of light sources 222a-c may be arranged along a focal surface that is curved in a vertical plane. For example, the curved focal surface 228 can have a curvature in a vertical plane, and the plurality of light sources 222a-c can include additional light sources arranged vertically along the curved focal surface 228 and configured to emit light beams directed at the mirror 224 and reflected through the exit aperture 226.

Due to the arrangement of the plurality of light sources 222a-c along the curved focal surface 228, the plurality of light beams 202a-c, in some examples, may converge towards the exit aperture 226. Thus, in these examples, the exit aperture 226 may be minimally sized while being capable of accommodating vertical and horizontal extents of the plurality of light beams 202a-c. Additionally, in some examples, the curved focal surface 228 can be defined by the lens 250. For example, the curved focal surface 228 may correspond to a focal surface of the lens 250 due to shape and composition of the lens 250. In this example, the plurality of light sources 222a-c can be arranged along the focal surface defined by the lens 250 at the transmit block.

The plurality of light beams 202a-c propagate in a transmit path that extends through the transmit block 220, the exit aperture 226, and the shared space 240 towards the lens 250. The lens 250 collimates the plurality of light beams 202a-c to provide collimated light beams 204a-c into an environment of the LIDAR device 200. The collimated light beams 204a-c correspond, respectively, to the plurality of light beams 202a-c. In some examples, the collimated light beams 204a-c reflect off one or more objects in the environment of the LIDAR device 200 as reflected light 206. The reflected light 206 may be focused by the lens 250 into the shared space 240 as focused light 208 traveling along a receive path that extends through the shared space 240 onto the receive block 230. For example, the focused light 208 may be reflected by the reflective surface 242 as focused light 208a-c propagating towards the receive block 230.

The lens 250 may be capable of both collimating the plurality of light beams 202a-c and focusing the reflected light 206 along the receive path 208 towards the receive block 230 due to shape and composition of the lens 250. For example, the lens 250 can have an aspheric surface 252 facing outside of the housing 210 and a toroidal surface 254 facing the shared space 240. By using the same lens 250 to perform both of these functions, instead of a transmit lens for collimating and a receive lens for focusing, advantages with respect to size, cost, and/or complexity can be provided.

The exit aperture 226 is included in a wall 244 that separates the transmit block 220 from the shared space 240. In some examples, the wall 244 can be formed from a transparent material (e.g., glass) that is coated with a reflective material 242. In this example, the exit aperture 226 may correspond to the portion of the wall 244 that is not coated by the reflective material 242. Additionally or alternatively, the exit aperture 226 may comprise a hole or cut-away in the wall 244.

The focused light 208 is reflected by the reflective surface 242 and directed towards an entrance aperture 234 of the receive block 230. In some examples, the entrance aperture 234 may comprise a filtering window configured to allow wavelengths in the wavelength range of the plurality of light beams 202a-c emitted by the plurality of light sources 222a-c and attenuate other wavelengths. The focused light 208a-c reflected by the reflective surface 242 from the focused light 208 propagates, respectively, onto a plurality of detectors 232a-c. The structure, function, and operation of the entrance aperture 234 and the plurality of detectors 232a-c is similar, respectively, to the entrance aperture 134 and the plurality of detectors 132 included in the LIDAR device 100 described in FIG. 1.

The plurality of detectors 232a-c can be arranged along a curved focal surface 238 of the receive block 230. Although FIG. 2 shows that the curved focal surface 238 is curved along the x-y plane (horizontal plane), additionally or alternatively, the curved focal surface 238 can be curved in a vertical plane. The curvature of the focal surface 238 is also defined by the lens 250. For example, the curved focal surface 238 may correspond to a focal surface of the light projected by the lens 250 along the receive path at the receive block 230.

Each of the focused light 208a-c corresponds, respectively, to the emitted light beams 202a-c and is directed onto, respectively, the plurality of detectors 232a-c. For example, the detector 232a is configured and arranged to received focused light 208a that corresponds to collimated light beam 204a reflected of the one or more objects in the environment of the LIDAR device 200. In this example, the collimated light beam 204a corresponds to the light beam 202a emitted by the light source 222a. Thus, the detector 232a receives light that was emitted by the light source 222a, the detector 232b receives light that was emitted by the light source 222b, and the detector 232c receives light that was emitted by the light source 222c.

By comparing the received light 208a-c with the emitted light beams 202a-c, at least one aspect of the one or more object in the environment of the LIDAR device 200 may be determined. For example, by comparing a time when the plurality of light beams 202a-c were emitted by the plurality of light sources 222a-c and a time when the plurality of detectors 232a-c received the focused light 208a-c, a distance between the LIDAR device 200 and the one or more object in the environment of the LIDAR device 200 may be determined. In some examples, other aspects such as shape, color, material, etc. may also be determined.

In some examples, the LIDAR device 200 may be rotated about an axis to determine a three-dimensional map of the surroundings of the LIDAR device 200. For example, the LIDAR device 200 may be rotated about a substantially vertical axis as illustrated by arrow 290. Although illustrated that the LIDAR device 200 is rotated counter clock-wise about the axis as illustrated by the arrow 290, additionally or alternatively, the LIDAR device 200 may be rotated in the clockwise direction. In some examples, the LIDAR device 200 may be rotated 360 degrees about the axis. In other examples, the LIDAR device 200 may be rotated back and forth along a portion of the 360 degree view of the LIDAR device 200. For example, the LIDAR device 200 may be mounted on a platform that wobbles back and forth about the axis without making a complete rotation.

Figure 3A:
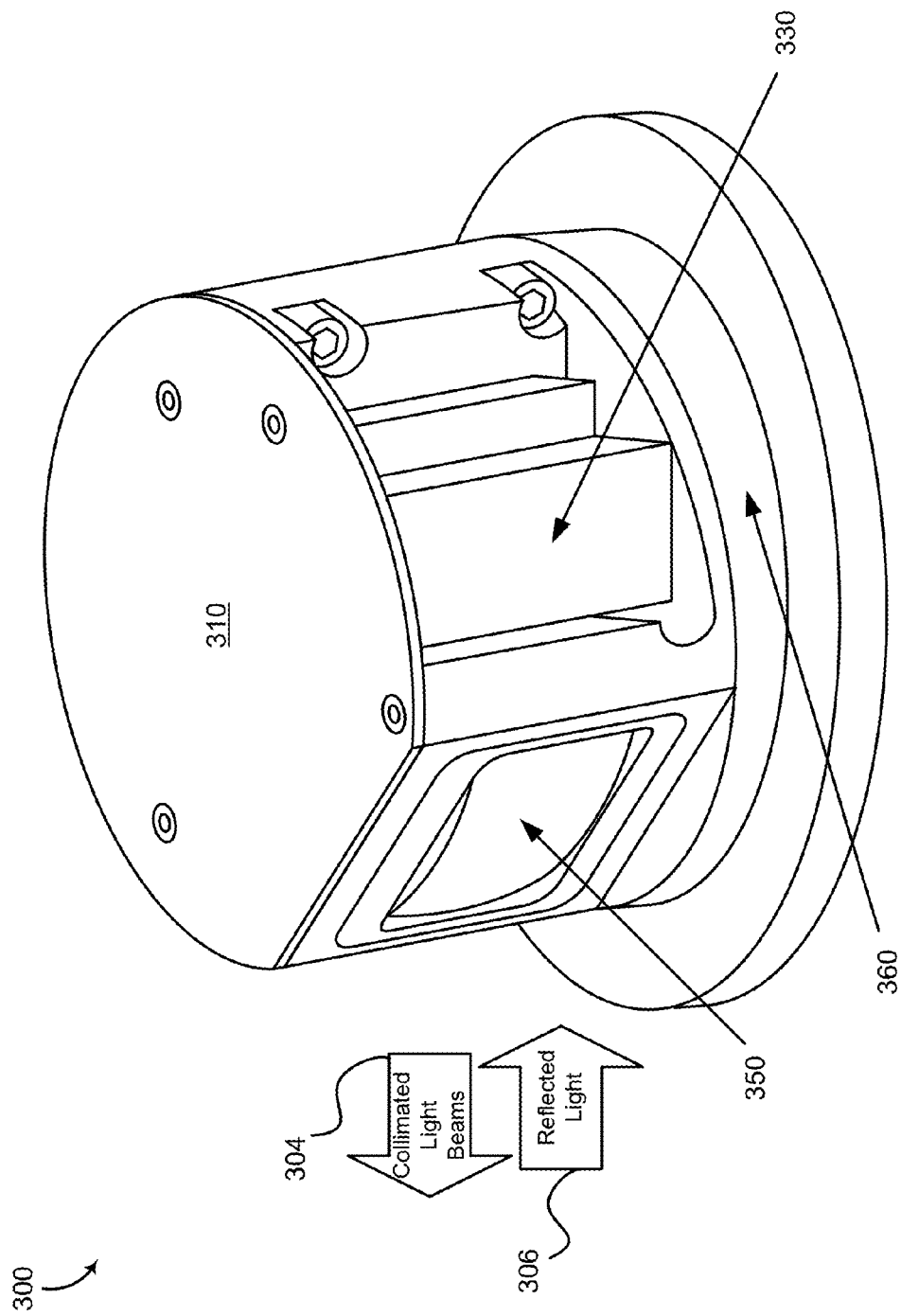
FIG. 3A is a perspective view of an example LIDAR device fitted with various components, in accordance with at least some embodiments described herein
Figure 3B:
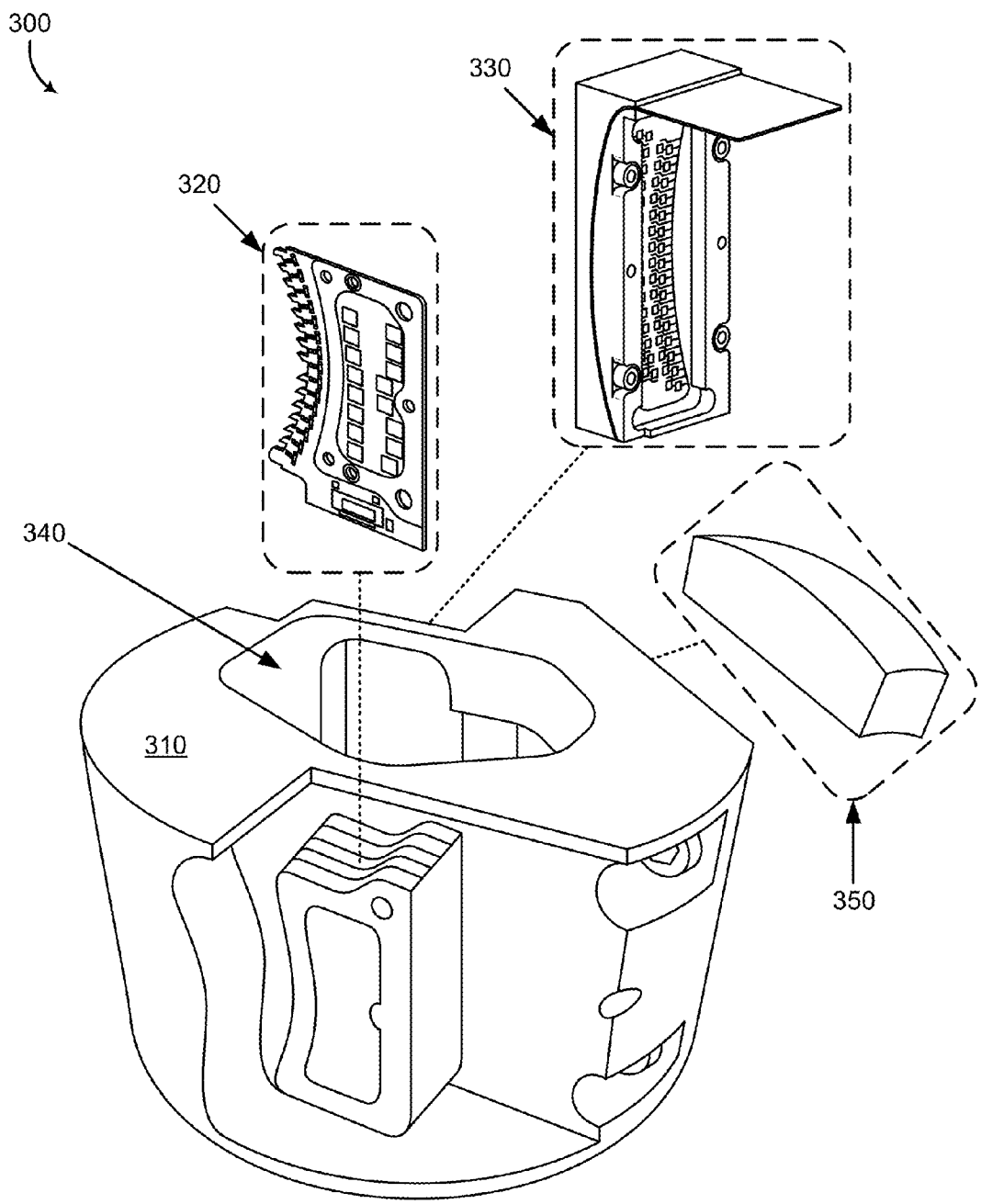
FIG. 3B is a perspective view of the example LIDAR device shown in FIG. 3A with the various components removed to illustrate interior space of the housing.

FIG. 3A is a perspective view of an example LIDAR device 300 fitted with various components, in accordance with at least some embodiments described herein. FIG. 3B is a perspective view of the example LIDAR device 300 shown in FIG. 3A with the various components removed to illustrate interior space of the housing 310. The structure, function, and operation of the LIDAR device 300 is similar to the LIDAR devices 100 and 200 described, respectively, in FIGS. 1 and 2. For example, the LIDAR device 300 includes a housing 310 that houses a transmit block 320, a receive block 330, and a lens 350 that are similar, respectively, to the housing 110, the transmit block 120, the receive block 130, and the lens 150 described in FIG. 1. Additionally, collimated light beams 304 propagate from the lens 350 toward an environment of the LIDAR device 300 and reflect of one or more objects in the environment as reflected light 306, similarly to the collimated light beams 104 and reflected light 106 described in FIG. 1.

The LIDAR device 300 can be mounted on a mounting structure 360 and rotated about an axis to provide a 360 degree view of the environment surrounding the LIDAR device 300. In some examples, the mounting structure 360 may comprise a movable platform that may tilt in one or more directions to change the axis of rotation of the LIDAR device 300.

As illustrated in FIG. 3B, the various components of the LIDAR device 300 can be removably mounted to the housing 310. For example, the transmit block 320 may comprise one or more printed circuit boards (PCBs) that are fitted in the portion of the housing 310 where the transmit block 320 can be mounted. Additionally, the receive block 330 may comprise a plurality of detectors 332 mounted to a flexible substrate and can be removably mounted to the housing 310 as a block that includes the plurality of detectors. Similarly, the lens 350 can be mounted to another side of the housing 310.

A plurality of light beams 302 can be transmitted by the transmit block 320 into the shared space 340 and towards the lens 350 to be collimated into the collimated light beams 304. Similarly, the received light 306 can be focused by the lens 350 and directed through the shared space 340 onto the receive block 330.

Figure 4:
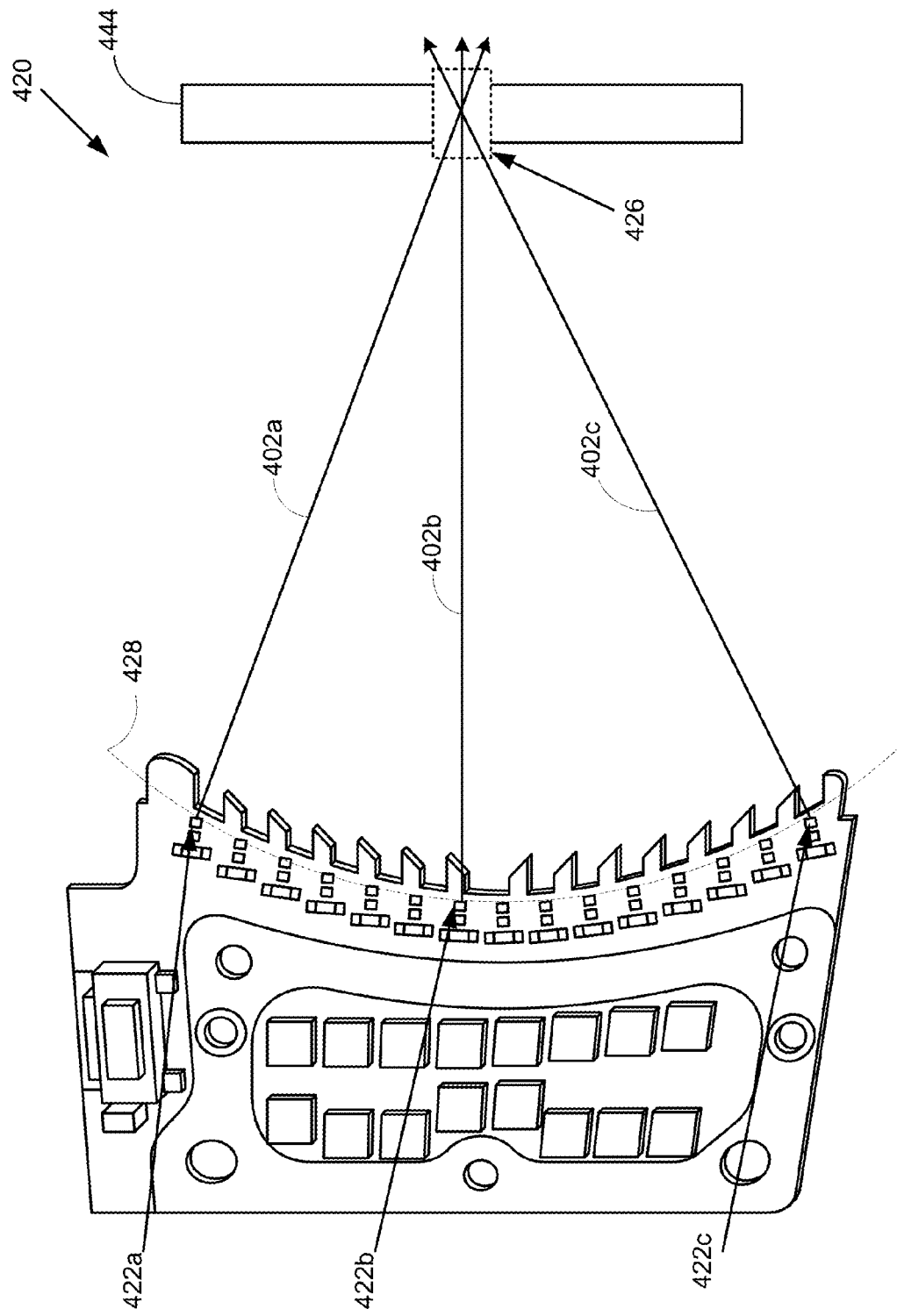
FIG. 4 illustrates an example transmit block, in accordance with at least some embodiments described herein.

FIG. 4 illustrates an example transmit block 420, in accordance with at least some embodiments described herein. Transmit block 420 can correspond to the transmit blocks 120, 220, and 320 described in FIGS. 1-3. For example, the transmit block 420 includes a plurality of light sources 422a-c similar to the plurality of light sources 222a-c included in the transmit block 220 of FIG. 2. Additionally, the light sources 422a-c are arranged along a focal surface 428, which is curved in a vertical plane. The light sources 422a-c are configured to emit a plurality of light beams 402a-c that converge and propagate through an exit aperture 426 in a wall 444.

Although the plurality of light sources 422a-c can be arranged along a focal surface 428 that is curved in a vertical plane, additionally or alternatively, the plurality of light sources 422a-c can be arranged along a focal surface that is curved in a horizontal plane or a focal surface that is curved both vertically and horizontally. For example, the plurality of light sources 422a-c can be arranged in a curved three dimensional grid pattern. For example, the transmit block 420 may comprise a plurality of printed circuit board (PCB) vertically mounted such that a column of light sources such as the plurality of light sources 422a-c are along the vertical axis of each PCB and each of the plurality of PCBs can be arranged adjacent to other vertically mounted PCBs along a horizontally curved plane to provide the three dimensional grid pattern.

As shown in FIG. 4, the light beams 402a-c converge towards the exit aperture 426 which allows the size of the exit aperture 426 to be minimized while accommodating vertical and horizontal extents of the light beams 402a-c similarly to the exit aperture 226 described in FIG. 2.

Figure 5A:
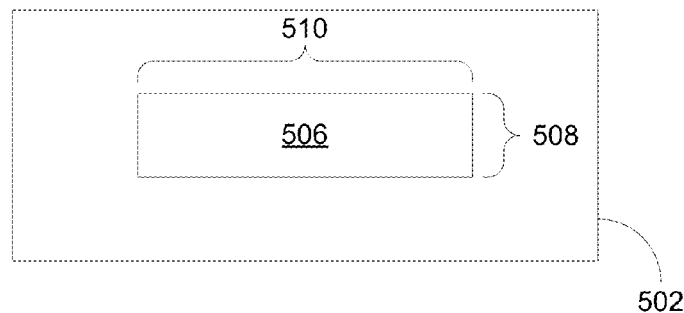
FIG. 5A is a view of an example light source, in accordance with an example embodiment.
Figure 5B:
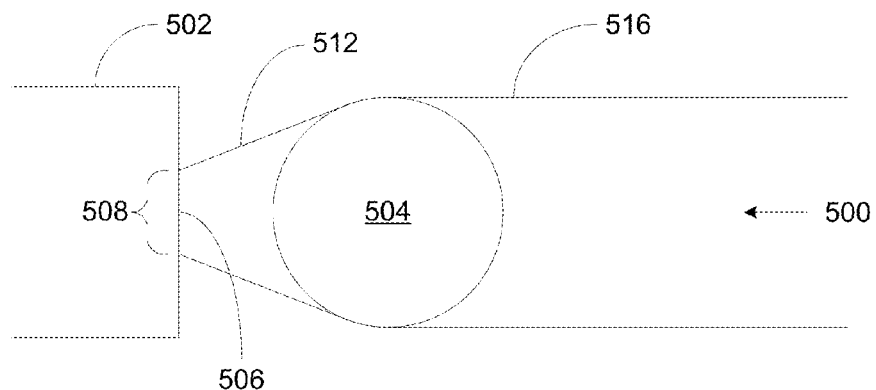
FIG. 5B is a view of the light source of FIG. 5A in combination with a cylindrical lens, in accordance with an example embodiment.
Figure 5C:
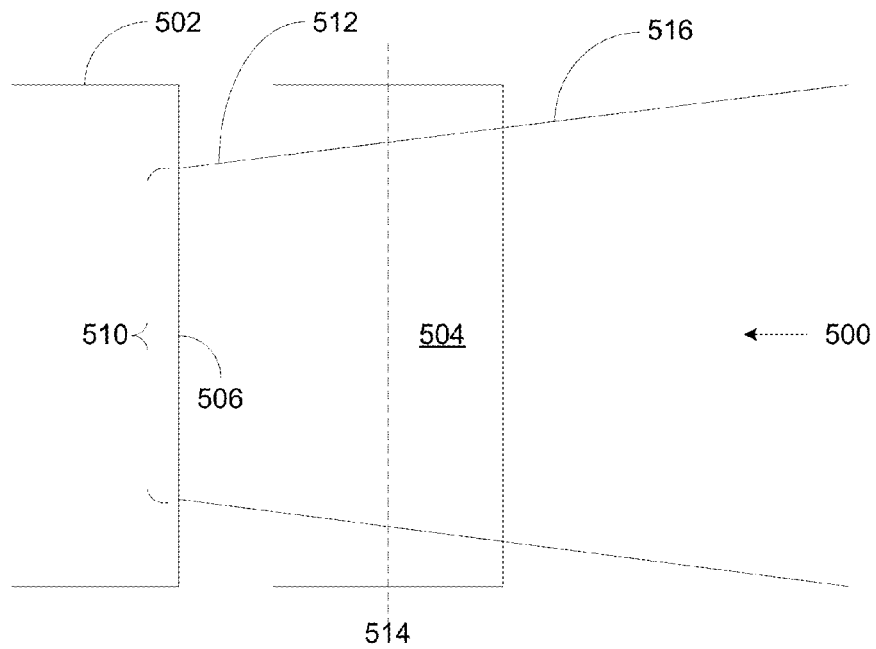
FIG. 5C is another view of the light source and cylindrical lens combination of FIG. 5B, in accordance with an example embodiment.

As noted above in the description of FIG. 1, the light from light sources 122 could be partially collimated to fit through the exit aperture 124. FIGS. 5A, 5B, and 5C illustrate an example of how such partial collimation could be achieved. In this example, a light source 500 is made up of a laser diode 502 and a cylindrical lens 504. As shown in FIG. 5A, laser diode 502 has an aperture 506 with a shorter dimension corresponding to a fast axis 508 and a longer dimension corresponding to a slow axis 510. FIGS. 5B and 5C show an uncollimated laser beam 512 being emitted from laser diode 502. Laser beam 512 diverges in two directions, one direction defined by fast axis 508 and another, generally orthogonal direction defined by slow axis 510. FIG. 5B shows the divergence of laser beam 512 along fast axis 508, whereas FIG. 5C shows the divergence of laser beam 512 along slow axis 510. Laser beam 512 diverges more quickly along fast axis 508 than along slow axis 510.

In one specific example, laser diode 502 is an Osram SPL DL90_3 nanostack pulsed laser diode that emits pulses of light with a range of wavelengths from about 896 nm to about 910 nm (a nominal wavelength of 905 nm). In this specific example, the aperture has a shorter dimension of about 10 microns, corresponding to its fast axis, and a longer dimension of about 200 microns, corresponding to its slow axis. The divergence of the laser beam in this specific example is about 25 degrees along the fast axis and about 11 degrees along the slow axis. It is to be understood that this specific example is illustrative only. Laser diode 502 could have a different configuration, different aperture sizes, different beam divergences, and/or emit different wavelengths.

As shown in FIGS. 5B and 5C, cylindrical lens 504 may be positioned in front of aperture 506 with its cylinder axis 514 generally parallel to slow axis 510 and perpendicular to fast axis 508. In this arrangement, cylindrical lens 504 can pre-collimate laser beam 512 along fast axis 508, resulting in partially collimated laser beam 516. In some examples, this pre-collimation may reduce the divergence along fast axis 508 to about one degree or less. Nonetheless, laser beam 516 is only partially collimated because the divergence along slow axis 510 may be largely unchanged by cylindrical lens 504. Thus, whereas uncollimated laser beam 512 emitted by laser diode has a higher divergence along fast axis 508 than along slow axis 510, partially collimated laser beam 516 provided by cylindrical lens 504 may have a higher divergence along slow axis 510 than along fast axis 508. Further, the divergences along slow axis 510 in uncollimated laser beam 512 and in partially collimated laser beam 516 may be substantially equal.

In one example, cylindrical lens 504 is a microrod lens with a diameter of about 600 microns that is placed about 250 microns in front of aperture 506. The material of the microrod lens could be, for example, fused silica or a borosilicate crown glass, such as Schott BK7. Alternatively, the microrod lens could be a molded plastic cylinder or acylinder. Cylindrical lens 504 could also be used to provide magnification along fast axis 508. For example, if the dimensions of aperture 506 are 10 microns by 200 microns, as previously described, and cylindrical lens 504 is a microrod lens as described above, then cylindrical lens 504 may magnify the shorter dimension (corresponding to fast axis 508) by about 20 times. This magnification effectively stretches out the shorter dimension of aperture 506 to about the same as the longer dimension. As a result, when light from laser beam 516 is focused, for example, focused onto a detector, the focused spot could have a substantially square shape instead of the rectangular slit shape of aperture 506.

Figure 6A:
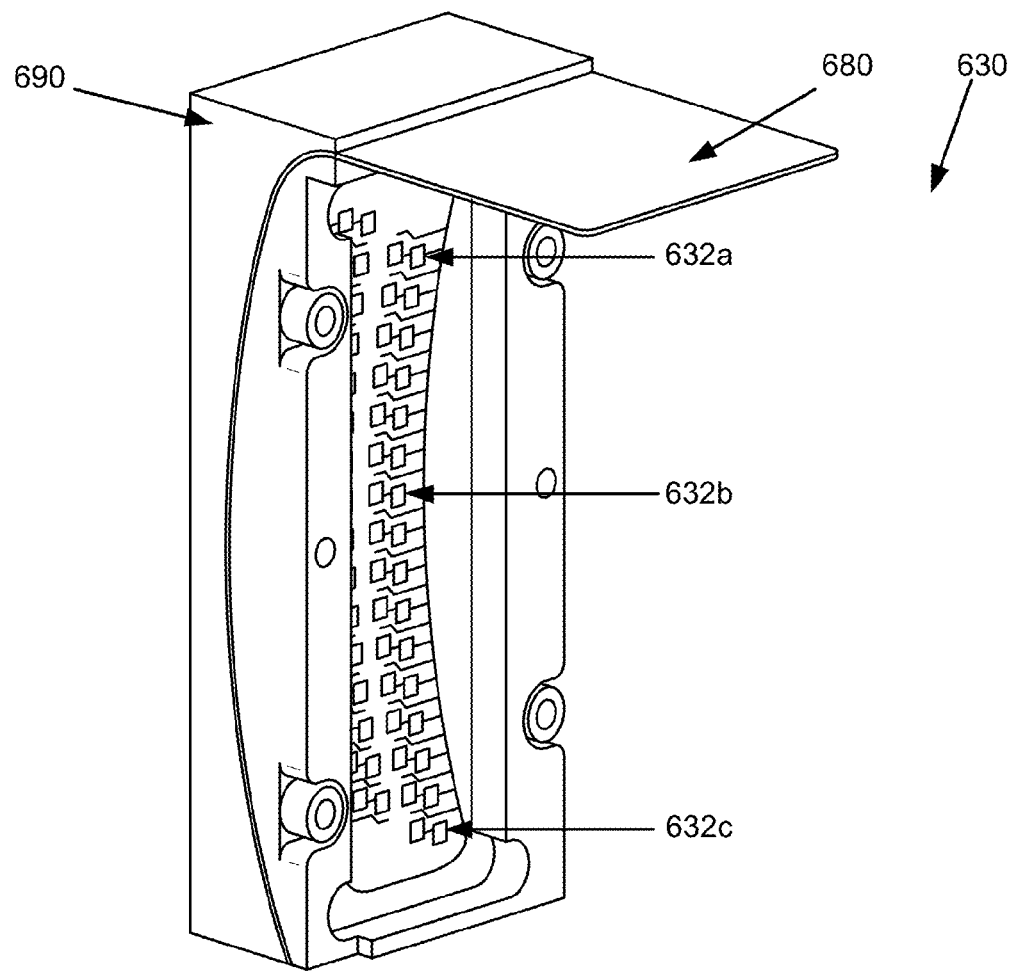
FIG. 6A illustrates an example receive block, in accordance with at least some embodiments described herein.
Figure 6B:
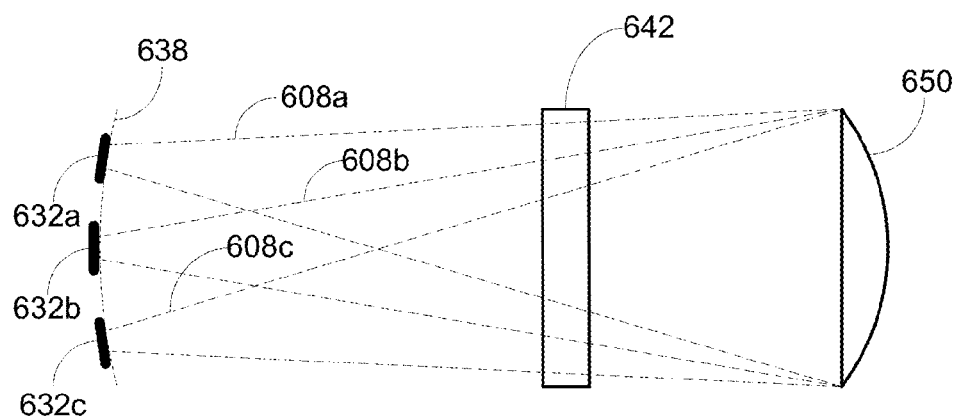
FIG. 6B illustrates a side view of three detectors included in the receive block of FIG. 6A.

FIG. 6A illustrates an example receive block 630, in accordance with at least some embodiments described herein. FIG. 6B illustrates a side view of three detectors 632a-c included in the receive block 630 of FIG. 6A. Receive block 630 can correspond to the receive blocks 130, 230, and 330 described in FIGS. 1-3. For example, the receive block 630 includes a plurality of detectors 632a-c arranged along a curved surface 638 defined by a lens 650 similarly to the receive block 230, the detectors 232 and the curved plane 238 described in FIG. 2. Focused light 608a-c from lens 650 propagates along a receive path that includes a reflective surface 642 onto the detectors 632a-c similar, respectively, to the focused light 208a-c, the lens 250, the reflective surface 242, and the detectors 232a-c described in FIG. 2.

The receive block 630 comprises a flexible substrate 680 on which the plurality of detectors 632a-c are arranged along the curved surface 638. The flexible substrate 680 conforms to the curved surface 638 by being mounted to a receive block housing 690 having the curved surface 638. As illustrated in FIG. 6, the curved surface 638 includes the arrangement of the detectors 632a-c curved along a vertical and horizontal axis of the receive block 630.

Figure 7A:
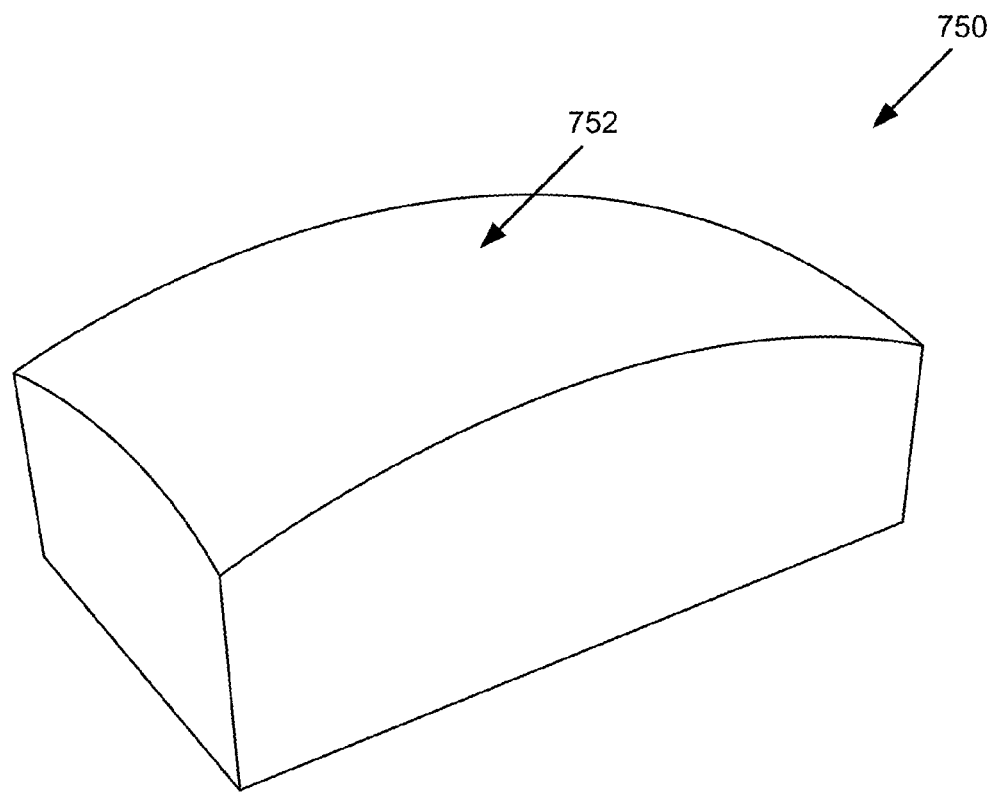
FIG. 7A illustrates an example lens with an aspheric surface and a toroidal surface, in accordance with at least some embodiments described herein.
Figure 7B:
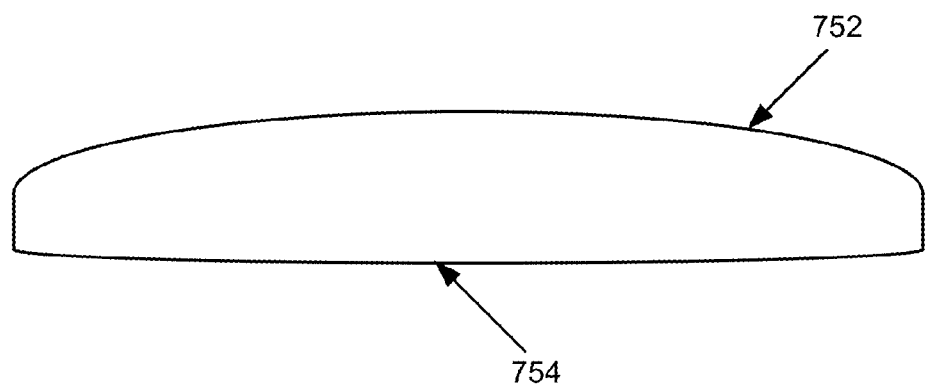
FIG. 7B illustrates a cross-section view of the example lens 750 shown in FIG. 7A.

FIGS. 7A and 7B illustrate an example lens 750 with an aspheric surface 752 and a toroidal surface 754, in accordance with at least some embodiments described herein. FIG. 7B illustrates a cross-section view of the example lens 750 shown in FIG. 7A. The lens 750 can correspond to lens 150, 250, and 350 included in FIGS. 1-3. For example, the lens 750 can be configured to both collimate light incident on the toroidal surface 754 from a light source into collimated light propagating out of the aspheric surface 752, and focus reflected light entering from the aspheric surface 752 onto a detector. The structure of the lens 750 including the aspheric surface 752 and the toroidal surface 754 allows the lens 750 to perform both functions of collimating and focusing described in the example above.

In some examples, the lens 750 defines a focal surface of the light propagating through the lens 750 due to the aspheric surface 752 and the toroidal surface 754. In these examples, the light sources providing the light entering the toroidal surface 754 can be arranged along the defined focal surface, and the detectors receiving the light focused from the light entering the aspheric surface 752 can also be arranged along the defined focal surface.

By using the lens 750 that performs both of these functions (collimating transmitted light and focusing received light), instead of a transmit lens for collimating and a receive lens for focusing, advantages with respect to size, cost, and/or complexity can be provided.

Figure 8A:
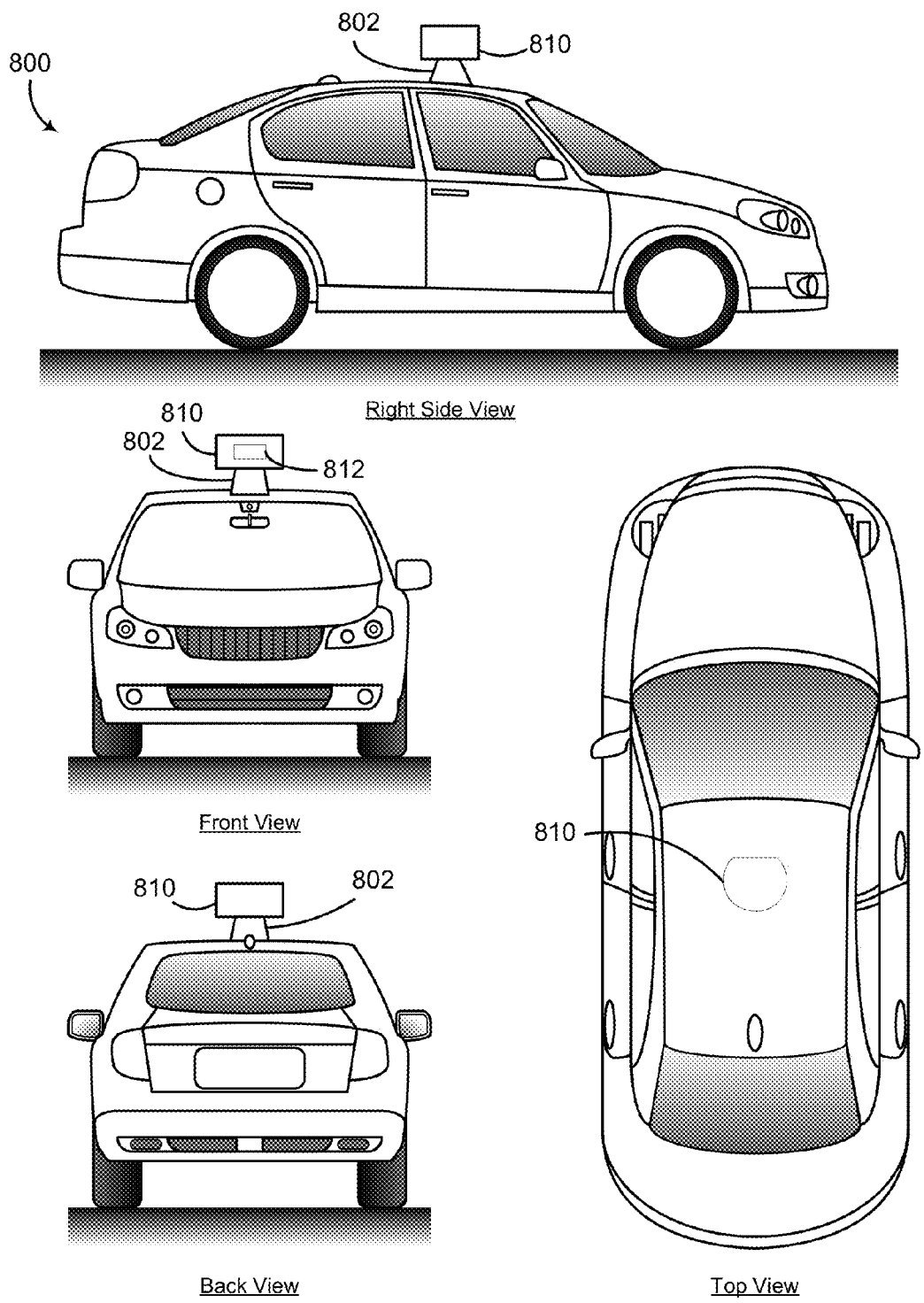
FIG. 8A illustrates an example LIDAR device mounted on a vehicle, in accordance with at least some embodiments described herein.

FIG. 8A illustrates an example LIDAR device 810 mounted on a vehicle 800, in accordance with at least some embodiments described herein. FIG. 8A shows a Right Side View, Front View, Back View, and Top View of the vehicle 800. Although vehicle 800 is illustrated in FIG. 8 as a car, other examples are possible. For instance, the vehicle 800 could represent a truck, a van, a semi-trailer truck, a motorcycle, a golf cart, an off-road vehicle, or a farm vehicle, among other examples.

The structure, function, and operation of the LIDAR device 810 shown in FIG. 8A is similar to the example LIDAR devices 100, 200, and 300 shown in FIGS. 1-3. For example, the LIDAR device 810 can be configured to rotate about an axis and determine a three-dimensional map of a surrounding environment of the LIDAR device 810. To facilitate the rotation, the LIDAR device 810 can be mounted on a platform 802. In some examples, the platform 802 may comprise a movable mount that allows the vehicle 800 to control the axis of rotation of the LIDAR device 810.

While the LIDAR device 810 is shown to be mounted in a particular location on the vehicle 800, in some examples, the LIDAR device 810 may be mounted elsewhere on the vehicle 800. For example, the LIDAR device 810 may be mounted anywhere on top of the vehicle 800, on a side of the vehicle 800, under the vehicle 800, on a hood of the vehicle 800, and/or on a trunk of the vehicle 800.

The LIDAR device 810 includes a lens 812 through which collimated light is transmitted from the LIDAR device 810 to the surrounding environment of the LIDAR device 810, similarly to the lens 150, 250, and 350 described in FIGS. 1-3. Similarly, the lens 812 can also be configured to receive reflected light from the surrounding environment of the LIDAR device 810 that were reflected off one or more objects in the surrounding environment.

Figure 8B:
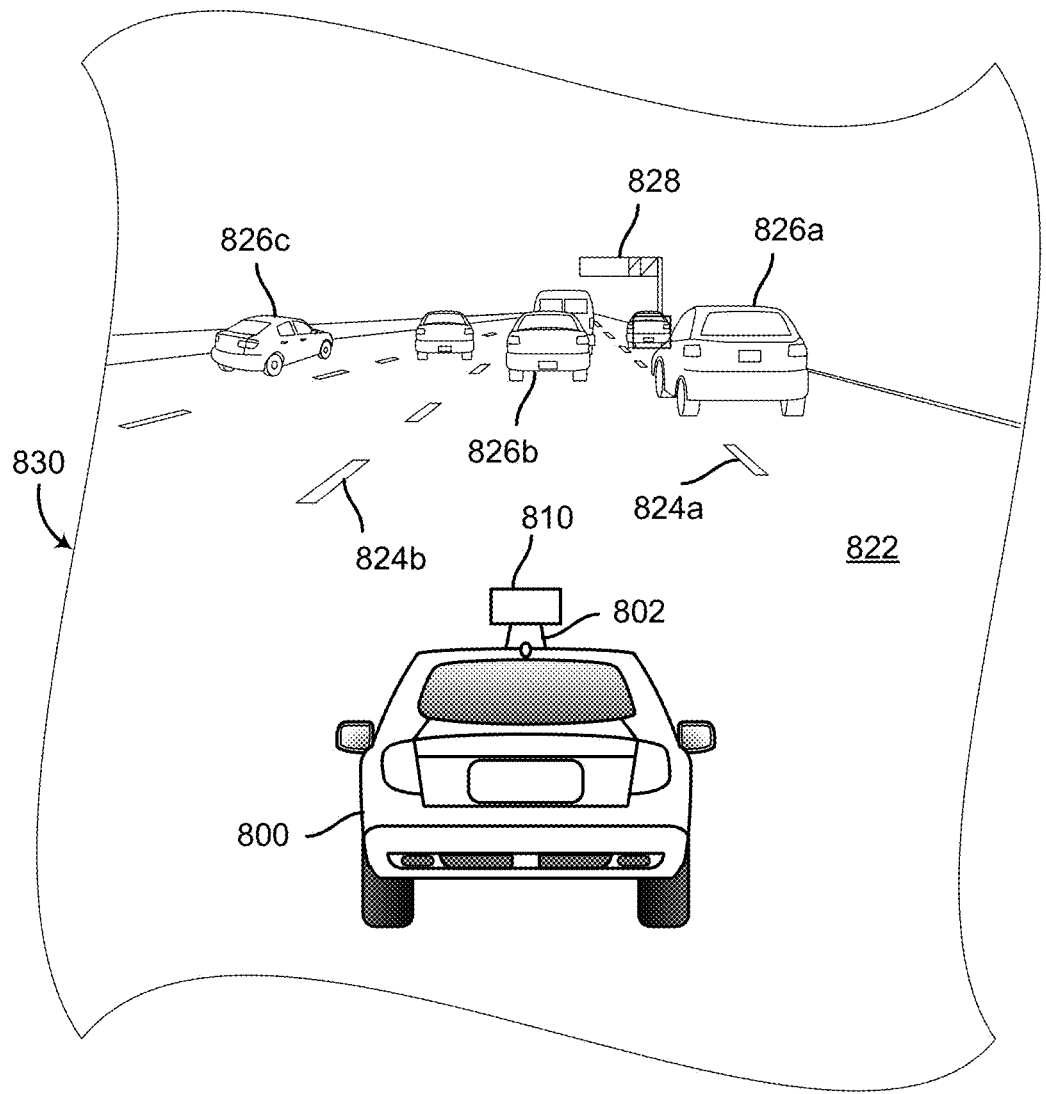
FIG. 8B illustrates a scenario where the LIDAR device shown in FIG. 8A is scanning an environment that includes one or more objects, in accordance with at least some embodiments described herein.

FIG. 8B illustrates a scenario where the LIDAR device 810 shown in FIG. 8A and scanning an environment 830 that includes one or more objects, in accordance with at least some embodiments described herein. In this example scenario, vehicle 800 can be traveling on a road 822 in the environment 830. By rotating the LIDAR device 810 about the axis defined by the platform 802, the LIDAR device 810 may be able to determine aspects of objects in the surrounding environment 830, such as lane lines 824a-b, other vehicles 826a-c, and/or street sign 828. Thus, the LIDAR device 810 can provide the vehicle 800 with information about the objects in the surrounding environment 830, including distance, shape, color, and/or material type of the objects.

Figure 9:
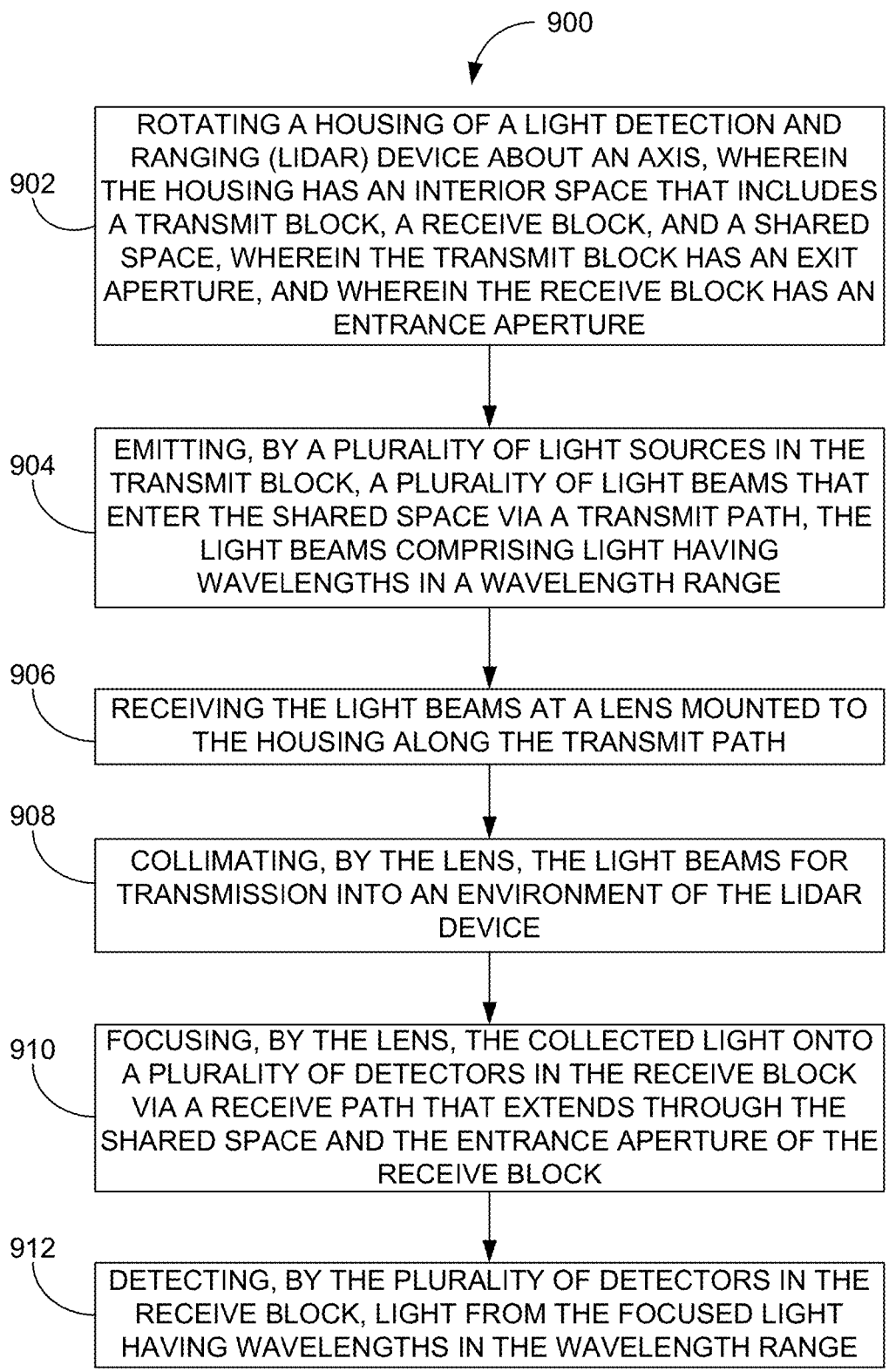
FIG. 9 is a flowchart of a method, in accordance with at least some embodiments described herein.

FIG. 9 is a flowchart of a method 900 of operating a LIDAR device, in accordance with at least some embodiments described herein. Method 900 shown in FIG. 9 presents an embodiment of a method that could be used with the LIDAR devices 100, 200, and 300, for example. Method 900 may include one or more operations, functions, or actions as illustrated by one or more of blocks 902-912. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of a manufacturing or operation process.

At block 902, the method 900 includes rotating a housing of a light detection and ranging (LIDAR) device about an axis, wherein the housing has an interior space that includes a transmit block, a receive block, and a shared space, wherein the transmit block has an exit aperture, and wherein the receive block has an entrance aperture.

At block 904, the method 900 includes emitting, by a plurality of light sources in the transmit block, a plurality of light beams that enter the shared space via a transmit path, the light beams comprising light having wavelengths in a wavelength range.

At block 906, the method 900 includes receiving the light beams at a lens mounted to the housing along the transmit path.

At block 908, the method 900 includes collimating, by the lens, the light beams for transmission into an environment of the LIDAR device.

At block 910, the method 900 includes focusing, by the lens, the collected light onto a plurality of detectors in the receive block via a receive path that extends through the shared space and the entrance aperture of the receive block.

At block 912, the method 900 includes detecting, by the plurality of detectors in the receive block, light from the focused light having wavelengths in the wavelength range.

For example, a LIDAR device such as the LIDAR device 200 can be rotated about an axis (block 902). A transmit block, such as the transmit block 220, can include a plurality of light sources that emit light beams having wavelengths in a wavelength range, through an exit aperture and a shared space to a lens (block 904). The light beams can be received by the lens (block 906) and collimated for transmission to an environment of the LIDAR device (block 908). The collimated light may then reflect off one or more objects in the environment of the LIDAR device and return as reflected light collected by the lens. The lens may then focus the collected light onto a plurality of detectors in the receive block via a receive path that extends through the shared space and an entrance aperture of the receive block (block 910). The plurality of detectors in the receive block may then detect light from the focused light having wavelengths in the wavelength range of the emitted light beams from the light sources (block 912).

Within examples, devices and operation methods described include a LIDAR device rotated about an axis and configured to transmit collimated light and focus reflected light. The collimation and focusing can be performed by a shared lens. By using a shared lens that performs both of these functions, instead of a transmit lens for collimating and a receive lens for focusing, advantages with respect to size, cost, and/or complexity can be provided. Additionally, in some examples, the shared lens can define a curved focal surface. In these examples, the light sources emitting light through the shared lens and the detectors receiving light focused by the shared lens can be arranged along the curved focal surface defined by the shared lens.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A light detection and ranging (LIDAR) device, comprising:
   a lens mounted to a housing, wherein the housing is configured to rotate about an axis and has an interior space that includes a transmit block, a receive block, a transmit path, and a receive path, wherein the transmit block has an exit aperture in a wall that comprises a reflective surface, wherein the receive block has an entrance aperture, wherein the transmit path extends from the exit aperture to the lens, and wherein the receive path extends from the lens to the entrance aperture via the reflective surface;
a plurality of light sources in the transmit block, wherein the plurality of light sources are configured to emit a plurality of light beams through the exit aperture in a plurality of different directions, the light beams comprising light having wavelengths in a wavelength range;
a plurality of detectors in the receive block, wherein the plurality of detectors are configured to detect light having wavelengths in the wavelength range; and
wherein the lens is configured to receive the light beams via the transmit path, collimate the light beams for transmission into an environment of the LIDAR device, collect light comprising light from one or more of the collimated light beams reflected by one or more objects in the environment of the LIDAR device, and focus the collected light onto the detectors via the receive path.

2. The LIDAR device of claim 1, wherein each detector in the plurality of detectors is associated with a corresponding light source in the plurality of light sources, and wherein the lens is configured to focus onto each detector a respective portion of the collected light that comprises light from the detector's corresponding light source.

3. The LIDAR device of claim 1, wherein the wall comprises a transparent material, the reflective surface covers a portion of the transparent material, and the exit aperture corresponds to a portion of the transparent material that is not covered by the reflective surface.

4. The LIDAR device of claim 1, wherein the transmit path at least partially overlaps the receive path.

5. The LIDAR device of claim 1, wherein the lens defines a curved focal surface in the transmit block and a curved focal surface in the receive block.

6. The LIDAR device of claim 5, wherein the light sources in the plurality of light sources are arranged in a pattern substantially corresponding to the curved focal surface in the transmit block, and wherein the detectors in the plurality of detectors are arranged in a pattern substantially corresponding to the curved focal surface in the receive block.

7. The LIDAR device of claim 1, wherein the lens has an aspheric surface and a toroidal surface.

8. The LIDAR device of claim 7, wherein the toroidal surface is in the interior space within the housing and the aspheric surface is outside of the housing.

9. The LIDAR device of claim 1, wherein the axis is substantially vertical.

10. The LIDAR device of claim 1, further comprising a mirror in the transmit block, wherein the mirror is configured to reflect the light beams toward the exit aperture.

11. The LIDAR device of claim 1, wherein the receive block comprises a sealed environment containing an inert gas.

12. The LIDAR device of claim 1, wherein the entrance aperture comprises a material that passes light having wavelengths in the wavelength range and attenuates light having other wavelengths.

13. The LIDAR device of claim 1, wherein each light source in the plurality of light sources comprises a respective laser diode.

14. The LIDAR device of claim 1, wherein each detector in the plurality of detectors comprises a respective avalanche photodiode.

15. A method comprising:
rotating a housing of a light detection and ranging (LIDAR) device about an axis, wherein the housing mounts a lens and has an interior space that includes a transmit block, a receive block, a transmit path, and a receive path, wherein the transmit block has an exit aperture in a wall that comprises a reflective surface, wherein the receive block has an entrance aperture, wherein the transmit path extends from the exit aperture to the lens, and wherein the receive path extends from the lens to the entrance aperture via the reflective surface;
emitting, by a plurality of light sources in the transmit block, a plurality of light beams through the exit aperture in a plurality of different directions, the light beams comprising light having wavelengths in a wavelength range;
receiving, by the lens, the light beams via the transmit path;
collimating, by the lens, the light beams for transmission into an environment of the LIDAR device;
collecting, by the lens, light from one or more of the collimated light beams reflected by one or more objects in the environment of the LIDAR device;
focusing, by the lens, the collected light onto a plurality of detectors in the receive block via the receive path; and
detecting, by the plurality of detectors in the receive block, light from the focused light having wavelengths in the wavelength range.

16. The method of claim 15, wherein each detector in the plurality of detectors is associated with a corresponding light source in the plurality of light sources, the method further comprising:
focusing onto each detector, by the lens, a respective portion of the collected light that comprises light from the detector's corresponding light source.

17. The method of claim 15, further comprising:
reflecting, by a mirror in the transmit block, the emitted light beams toward the exit aperture.

18. The method of claim 15, wherein the wall comprises a transparent material, the reflective surface covers a portion of the transparent material, and the exit aperture corresponds to a portion of the transparent material that is not covered by the reflective surface.

* * * * *